Patented Feb. 1, 1949

2,460,550

UNITED STATES PATENT OFFICE 2,460,550

MODIFIED GLOBIN AND METHOD FOR ITS PREPARATION

Max M. Strumia, Penn Valley, and Francis W. Chornock, Devon, Pa., assignors to The John S. Sharpe Research Foundation of The Bryn Mawr Hospital, a nonprofit corporation No Drawing. Application August 10, 1945, Serial No. 610,214

8 Claims. (Cl. 260—112)

This invention relates to a blood plasma substitute and nutritive and method for its preparation.

More particularly this invention relates to modified globin and to method for its preparation from erythrocytes.

The modified globin according to this invention may be readily dried and stored for considerable periods; it is nontoxic and stable under suitable conditions of preservation in aqueous solution; aqueous solutions made isotonic with sodium chloride of glucose are miscible in all proportions, without precipitation, clumping or hemolysis, with citrated human plasma and blood; and solutions in saline do not increase the rate of sedimentation of erythrocytes when added either in vitro or in vivo to whole blood.

The modified globin according to this invention possesses a high colloidal osmotic power to replace lost blood volume and has been used medically in cases of shock as a substitute for blood plasma with excellent results. The modified globin according to this invention is nontoxic and may be administered parenterally in quantities of up to 150 grams to obtain therapeutic effect, for example, in cases of shock. Further, it has been found, in extensive actual practice, that the modified globin according to this invention has an unexpectedly high nutritive value rendering it of great clincal value especially in parenteral feeding in hypoproteinemic patients even in the presence of liver damage.

By virtue of this invention the very large quantity, presently estimated at one and one-half billion cc. of packed erythrocytes, heretofore wasted in the preparation of plasma for the armed forces and civilian population is, by a process, rendered available for the production of a modified globin having an osmotic power of about twice that by an equal weight of plasma proteins.

As is well known, hemoglobin, a consituent of normal human blood amounting usually to about 14 to 16 grams per cent., is very soluble in water and is composed of iron, porphyrin and globin which latter constitutes about 96% of the total hemoglobin.

It is equally well known that these three components of hemoglobin can be separated chemically with relative ease, the globin being separated from the iron-porphyrin combination by the mild treatment of oxyhemoglobin with acid. However, globin as heretofore prepared in a number of forms from hemoglobin has proved of no value clinically since it has been found variously to be unstable, lacking in solubility, and to be toxic in small dosage.

A review of the literature develops that heretofore a number of globins have been obtained and which, depending upon the method of preparation, fall generally into three categories.

Thus Schultz in 1898, following a procedure outlined by Preyer in 1871, prepared relatively pure globin by the treatment of hemoglobin with relatively strong acid. The Schultz product was soluble in dilute acids and alkalies, but insoluble at its isoelectric point (a slightly alkaline pH) and differed from other proteins in its high carbon content (54.9%). It was basic in its properties and acted as a denatured protein. When reconstructed with alkaline haematin, this globin gives rise to a hemochromogen instead of methemoglobin and it is toxic in relatively small doses when inoculated into rabbits.

In 1926 Hill and Holden claim to have obtained an undenatured globin by using a minimum quantity of acid to split the hemoglobin and by carrying out all procedure at 0° C., without the use of alcohol. The globin solution thus obtained was stable at room temperature and was dried at 0° C. over sulphuric acid under vacuum.

The globin prepared by Hill and Holden had a solubility over a pH range of 5-10 and appeared relatively stable. It has been classified variously as an albumose and as a transitional substance falling somewhere between basic peptone and histone.

The most widely studied of the globins heretofore prepared is that prepared by Anson and Mirsky, who incorporated the use of an organic solvent (acetone) with the acid (hydrochloric) used in the splitting of the globin from the hemoglobin. Following the Anson and Mirsky procedure a soluble globin is prepared, which, however, is toxic to rabbits and is unstable, either as an acid powder or as an aqueous solution.

Essentially the various globins heretofore prepared have been unsuitable for administration to humans in quantities effective when used according to disclosure because of toxicity.

In distinction from the globins heretofore prepared, the modified globin according to this invention is possessed variously of characteristics which adapted it for clinical use as a substitute for blood plasma, as, for example, in cases of shock, and which may be detailed as follows:

1. Non-toxic in effective dosage, for example, 30 to 150 g.
2. The molecule is substantially symmetrical;
3. The molecular weight of 80% or more of the modified globin as determined by ultracentrifugal studies is around 34,000. This percentage varies to a certain extent with the process of preparation;
4. Solutions in 0.9% saline solution are stable under suitable conditions of preservation;
5. Solutions are miscible in all proportions without precipitation, clumping or hemolysis with citrated human plasma and blood;
6. Solutions in saline do not increase the rate of sedimentation of erythrocytes when added either in vitro or in vivo to whole blood;
7. It is soluble in water at pH 7.4 to a concentration of at least 25%;
8. It possesses a precipitation point on adding acid to a solution within the range pH 5.0–pH 6.8 and preferably at about pH 6.5;
9. The viscosity is appreciably lower than that of citrated plasma in iso-osmotic concentration;
10. The intravenous injection of sufficiently large quantities of the modified globin in normal or hypoproteinemic humans produces an hemodilution lasting, in the majority of cases, 48 to 120 hours.

In preparing the modified globin embodying this invention by the method according to this invention, the procedure basically involves the treatment of erythrocytes (red cells) with acid acetone, or by other suitable procedure for separating globin from hematin, and treatment of the resultant globin with alkali by dissolving in an aqueous solution of an alkali containing sufficient alkali to yield an alkaline globin solution which will have a pH in excess of pH 9.0; it being noted that a pH in excess of pH 9.0 is critical to effective modification of the globin.

More specifically, in proceeding according to this invention for the preparation of the modified globin embodying this invention, all types of erythrocytes and pooled mixtures of different types may be treated. And the modified globin can be prepared from erythrocytes of animals other than humans, such as, for example, rats, dogs, bovine animals, although human erythrocytes will be generally preferred. Natural erythrocytes up to, for example, fifteen days old may be used.

The erythrocytes, after filtering through pyrogen-free gauze and after washing with 0.9% saline solution one or more times, can be preserved until use under refrigeration or for longer periods in a frozen state, or dried after freezing to be regenerated with fluid when desired for the preparation of globin.

The erythrocytes after filtering through pyrogen-free gauze and after washing with 0.9% saline, which may be accomplished with one or more washings, are desirably lysed with pyrogen-free distilled water and then treated with a mixture of acid and acetone.

The acid will desirably be hydrochloric acid, though oxalic acid, or the like, may be used. Preferably the lysed erythrocytes will be added to the acid acetone by dripping, while agitating the acetone.

The rate of addition of the erythrocytes to the acid acetone may vary widely, as may the ratio of erythrocytes to acid acetone. Thus, the erythrocytes may be substantially poured into the acid acetone or dripped in over a long period, say, for example, at the rate of 30 drops per minute. The usual ratio of erythrocytes to acid acetone will be 1:10, but the ratio may be decreased, for example, to 1:3, or increased, e. g. 1:50. The acid concentration in the acetone may vary widely, for example, with hydrochloric acid, within the range one part concentrated acid (sp. gr. 1.18) to 40 parts of acetone to one part concentrated acid to 800 parts of acetone by volume. It is noted that the ratio of acid to packed erythrocytes will desirably be in about the range one part concentrated acid to five parts packed erythrocytes to one part concentrated acid to twenty parts packed erythrocytes by volume.

The degree of agitation, as by stirring, on the addition of the erythrocytes to the acid acetone may vary widely, it being noted that the greater the rate of stirring the finer the product will be and that with slow stirring the tendency will be toward an impure product requiring more washing. The time of agitation or stirring is not critical, it being noted that the longer the stirring is continued after completion of the addition of the erythrocytes the purer and more haematin free product is obtained. Usually the stirring will not be continued for more than fifteen minutes after the addition of the erythrocytes.

When the formation of the acid globin, by treatment of the lysed erythrocytes with acid acetone, is completed the mixture preferably is centrifuged or filtered and washed with acetone in any convenient manner in order to obtain a product as haematin free as possible. The acid globin is then dried in any convenient manner with precaution to so proceed that decomposition is held to a minimum. By way of example, the acid globin, while rolling in a mechanical roller, can be dried with air, air drying followed by desiccation over sulphuric acid or dehydrite, suction, or other suitable procedure.

If the acid globin is not to be further processed immediately it may, if substantially moisture-free, be kept in powder form for a period up to a few months, or the acid powder may be converted to the corresponding sodium salt and preserved in the alkaline state. The alkaline powder is stable for periods of nearly a year and when dissolved in water will give a clear solution at pH 9.4 and above.

The treatment of the acid globin, or of the alkaline powder, with alkali to produce the modified globin involves dissolving the acid globin in alkaline water, with agitation to facilitate solution, preferably at a moderately elevated temperature, and permitting to stand for a period. If desired the acid globin can be added to water or saline and the alkali added.

The alkaline water will desirably contain about 1.15 g. of sodium hydroxide, or equivalent weights of other suitable alkalies, such as potassium, ammonium, or the like, for each 5 g. of acid globin, calculated on the dry basis. However, the amount of alkli can be decreased, or the alkali may be increased up to 2 g. or more so long as sufficient alkali is used to give an alkaline globin solution having a pH in excess of pH 9.0.

The temperature at which the treatment with alkali is carried out is not critical. Thus, the treatment may be at from room temperature to boiling, the particular temperature and alkali concentration governing the time required to effect the modification.

In the treatment with alkali the concentration of acid globin in the solution may vary widely. Thus, while a concentration of about 4.5% will be found desirable, solutions of concentrations up to 20%, or even higher, may be treated.

The period of treatment of the acid globin will, as has been indicated, vary with alkali concentration and temperature, and the precipitation point of the globin to be prepared. Preferably the alkali treatment will be complete when the cloud or turbidity point of the treated globin comes at about pH 6.7 to 6.8 and gross precipitation begins at about pH 6.5, as may be readily determined by the addition of 10% hydrochloric acid to a sample of the solution and determining the pH of the cloud and precipitation points. However, it will be understood that the modified globin may have a precipitation point from about pH 5.0 to about pH 6.8. The modified globin will be soluble in water to form solutions at hydrogen ion concentration above about pH 6.8. The modified globin having a precipitation point on the acid side of the pH range does not precipitate in the vascular system as does globin precipitating in the alkaline range.

When the alkali treatment is complete, as noted by determination of the cloud and precipitation points, the solution is adjusted to a pH of about 7.4 by the addition of suitable acid such as hydrochloric. The modified globin in solution at this point must be freed from vasomotor and vasopressor substances which are formed during alkali treatment and from crystalloids. This may be accomplished by dialysis following any well known procedure.

In lieu of dialysis the vasomotor and vasopressor substances and crystalloids may be removed from the modified globin by precipitation of the modified globin from the neutralized solution. The precipitation may be effected, for example, with an acid such as hydrochloric, or the like, or, equivalently, with sodium chloride, or the like, to a concentration of about 75–90% of saturation of sodium chloride. The precipitated globin will be removed from the mother liquor by filtration, centrifuging or otherwise, washed with a solution of sodium chloride to a concentration of 75–90% of saturation, separated from the wash solution, then redissolved in distilled water to any desired concentration of globin and finally sterilized.

Where it is necessary to adjust the sodium chloride content, NaCl in 30% solution is added to make a final concentration of NaCl of 0.9% in solution.

The purified solution is then clarified, as, for example, through a Seitz clarifying filter, and sterilized, as, for example, by a Seitz sterilizing filter.

The modified globin as prepared above can be stored indefinitely in the liquid state at reduced temperatures, preferably at 4° C., or it may be frozen, or it may be frozen and dried from the frozen state for subsequent regeneration.

Various modified globin prepared within the ranges above described will be variously stable at various temperatures. Thus, a solution of modified globin having a precipitation point of pH 6.0 or less will be stable to boiling and may be stored in solution at room temperatures, while a solution of the preferred modified globin having a precipitation point of pH 6.5 will desirably be stored at refrigeration temperature, kept frozen or frozen and dried to be regenerated when prepared for use.

Now for the purpose of specific illustration and not by way of limitation, a modified globin embodying this invention and advantageous for use in cases of shock may be prepared, for example, by the following procedure:

Pyrogen-free and usually sterile erythrocytes from the preparation of sterile human citrated plasma, containing about 5–10% plasma and the buffy layer, are poured through pyrogen-free 40 mesh gauze into individual bottles to remove fibrin. The erythrocytes left in the original donor bottles are mixed with normal saline and the washings poured through the gauze into the bottle containing the filtered cells. Enough .9% saline is added so that the ratio of wash saline to the cells is about 3:1. The saline-erythrocyte mixture is then mixed and centrifuged at about 2400 R. P. M. for about 20 minutes.

Then the wash saline is removed by means of a sterile cannula and suction, as much of the remaining white cells being removed at this time as possible. The cells can be washed more than once, but there seems to be no physiologic difference in the final product prepared from once washed or three times washed cells. If storage at this point is desirable, the washed unlysed cells can be frozen and kept for a long period of time. They can then be thawed and lysed when ready for use. The usual procedure is to lyse the washed, well packed cells with an equal volume of pyrogen-free water by mixing. They are then stored at plus 4° C. until used.

For the preparation of the acid globin, 300 cc. of lysed erythrocyte solution are dripped into 3 liters of acetone containing 15 cc. of concentrated HCl, at room temperature. The addition of the erythrocytes is accomplished within 15 minutes. High speed mechanical stirring is employed to aid complete splitting of the globin from the hemoglobin. The stirring is continued for 10 minutes after the addition of the erythrocytes is completed.

The mixture is then filtered through a large Büchner funnel containing, for example, Whatman #2 paper, with the aid of suction. When the bulk of the acetone, which contains the heme, has been pulled through, the vacuum is cut off, and the crude globin is stirred up on the Büchner with the aid of about 750 cc. of acetone. A large spatula is used to break up any lumps which have formed. Suction is again applied to remove the wash acetone. This process is preferably repeated a total of three times.

At the end of the third wash, the globin is poured into a large beaker containing one liter of pure acetone. This mixture is stirred for about 5 minutes by a mechanical stirrer. The mixture is filtered on the Büchner and washed with one portion of about 750 cc. of acetone.

Suction is then applied to the washed globin until the odor of acetone is no longer discernable. The globin is broken up with a spatula and all small lumps are pulverized to aid in the drying process. When the atmosphere is quite humid, the globin can be removed from the Büchner funnel and spread on a stainless steel or glass plate and the acetone driven off with the aid of a small electric fan. Another drying procedure used is to pour the wet globin into a hollow cylinder, open at both ends, containing a wire sieve which rotates slowly. A glass rod is placed into the cylinder to crush any lumps.

The acid globin (containing about 9% "moisture") so prepared is then poured into and dissolved in alkaline water which has been heated to plus 37° C. on a water bath. The alkaline water is so prepared that for each 5 grams of globin, calculated on a dry basis, 1.15 g. of NaOH are available. The final concentration of the alkaline globin solution is about 4.5% and must have a pH of not less than pH 12.5 (corrected for sodium). Mechanical stirring is employed to aid solution of the globin. During this stirring period, considerable foaming occurs. The stirred solution is allowed to stand for a period of 15 minutes and is then filtered through 40 mesh pyrogen-free gauze. This removes any particulate matter in the globin solution. The filtered solution is then held at plus 37° C. for 20 hours.

At the end of this period, a 10 cc. aliquot is removed and its cloud and precipitation points determined by adding 10% HCl and obtaining the resultant pH by means of a pH meter. Alkali treatment is considered complete when the cloud or turbidity point comes at pH 6.7 to 6.8 and when gross precipitation begins at pH 6.5. Usually this point is reached in 20 hours. After determining the cloud and precipitation points in external samples, HCl is added to the bulk of the alkali-treated globin so that the final pH falls between 7.3–7.4 as determined by an outside electrode attachment of a pH meter.

Dialysis is carried out by agitation of the globin solution by means of a mechanical stirrer within a membrane with a constant change of water at plus 4° C. taking place outside the membrane. By this method of dialysis, vasomotor and vasopressor substances as well as crystalloids are removed.

Cellophane 300 PT or 450 PT (Du Pont) may be used for the dialysis membrane. The Cellophane is prepared by boiling for five minutes in pyrogen-free distilled water, followed by rinsing in pyrogen-free distilled water. The neutralized solution can also be dialyzed in two inch Visking sausage skin of such length that each bag holds 500 cc. of liquid. The sausage skins are cut to the required length, boiled in pyrogen-free water and then prepared for use by clamping off one end and placing a hollow metal cylinder on the other. Each bag is tested for leaks by filling with pyrogen-free water under slight pressure.

The bags are then hooked to a clamp and are filled about ⅔ full with the neutralized globin solution. These bags are then lowered into a large Pyrex jar containing pyrogen-free water and placed at plus 4° C. The water is changed four times during the next 48 hours at which time dialysis is considered to be complete. The volume of the globin and its protein content is measured before dialysis and after dialysis.

At the end of dialysis, the globin is removed from the bags by pouring into a pyrogen-free beaker. The pH of the solution is readjusted to 7.3–7.4. Volume and chloride content are now determined. Where it is necessary to adjust the sodium chloride content of the solution, sodium chloride (30% solution) is added to make a final concentration of NaCl of 0.9%. The nitrogen content and protein (Biuret) determinations are now made.

On completion of dialysis and adjustment of the pH and NaCl concentration the material is passed through a clarifying Seitz and then sterilized by Seitz filtration. The globin may be distributed either into albumin vials or into plasma bottles and stored at plus 4° C. Aliquots are removed during the distribution for sterility studies.

The modified globin which has been sterilized can be distributed into plasma bottles and shell-frozen and dried. Regeneration of this material with pyrogen-free water occurs quite readily. The presence of NaCl in the dried globin considerably shortens the period required for complete solution.

It will be understood that in proceeding in accordance with this invention for the production of the product thereof, as has been stated, animal erythrocytes may be used in place of human.

This application is a continuation-in-part of our application Serial No. 569,649, filed December 23, 1944 now abandoned.

What we claim and desire to protect by Letters Patent is:

1. The method of preparing a modified globin adapted for parenteral injection into humans which includes separating globin from the other components of hemoglobin and treating the separated globin with an alkali in aqueous solution of an alkali concentration such as to produce an alkaline globin solution having a pH in excess of pH 9.0 until the molecular weight of the globin is reduced to about one-half of that of the original globin.

2. The method of preparing a modified globin adapted for parenteral injection into humans which includes separating globin from the other components of hemoglobin and treating the separated globin with an alkali in aqueous solution of an alkali concentration such as to produce an alkaline globin solution having a pH in excess of pH 9.0 until the molecular weight of the globin is reduced to about one-half of that of the original globin and the precipitation point of the globin falls within about the range pH 5.0–pH 6.8.

3. The method of preparing a modified globin adapted for parenteral injection into humans which includes separating globin from the other components of human hemoglobin and treating the separated globin with an alkali in aqueous solution of an alkali concentration such as to produce an alkaline globin solution having a pH in excess of pH 9.0 until the molecular weight of the globin is reduced to about one-half of that of the original globin and the precipitation point of the globin on the addition of acid is about pH 6.5.

4. The method of preparing a modified globin adapted for parenteral injection into humans which includes separating globin from the other components of hemoglobin and treating the separated globin with an alkali in aqueous solution of an alkali concentration such as to produce an alkaline globin solution having a pH in excess of pH 9.0 until the molecular weight of the globin is reduced to about 34,000 and the precipitation point of the globin falls within about the range pH 5.0–pH 6.8.

5. The method of preparing a modified globin adapted for parenteral injection into humans which includes separating globin from the other components of hemoglobin and treating the separated globin with an alkali in aqueous solution of an alkali concentration such as to produce an alkaline globin solution having a pH in excess of pH 9.0 until the molecular weight of the globin is reduced to about 34,000 and the precipitation point of the globin on the addition of acid is about pH 6.5.

6. A modified globin prepared by the process of claim 1.

7. A modified globin prepared by the process of claim 2.

8. A modified globin prepared by the process of claim 3.

MAX M. STRUMIA.
FRANCIS W. CHORNOCK.

REFERENCES CITED

Will et al., "Biochem. Jour." (1926), pages 1326–1339.

Anson et al., "Jour. Gen. Physio." (1929–1930), pages 469–476.

Schmidt, "Chem. of the Amino Acids and Proteins," Charles C. Thomas Co. (1938), pages 176–177.

Mathews, Physiolog. Chem., 6th ed. (1939), pages 807–810.